United States Patent [19]

Ogino et al.

[11] 4,401,278
[45] Aug. 30, 1983

[54] APPARATUS FOR GRANULATING COAL

[75] Inventors: Etsuo Ogino; Nobuo Yoshii; Kazuo Harada, all of Osaka, Japan

[73] Assignee: Hitachi Shipbuilding & Engineering Co., Ltd., Osaka, Japan

[21] Appl. No.: 247,188

[22] Filed: Mar. 24, 1981

[30] Foreign Application Priority Data

| Mar. 28, 1980 [JP] | Japan | 55-40920 |
| Mar. 28, 1980 [JP] | Japan | 55-40921 |
| Mar. 28, 1980 [JP] | Japan | 55-40922 |
| Apr. 15, 1980 [JP] | Japan | 55-49874 |
| Apr. 15, 1980 [JP] | Japan | 55-51298[U] |
| Nov. 20, 1980 [JP] | Japan | 55-164189 |

[51] Int. Cl.³ .............................................. B02C 23/36
[52] U.S. Cl. .................................. 241/46.17; 366/316
[58] Field of Search ..................... 241/46.11, 46.17; 366/315, 316, 605

[56] References Cited

U.S. PATENT DOCUMENTS

| 1,774,910 | 9/1930 | Whatmough | 241/46.17 X |
| 2,859,199 | 9/1958 | Holzer | 241/46.11 X |
| 2,869,838 | 1/1959 | Ryder | 366/316 |
| 3,888,427 | 6/1975 | Derouineau | 241/46.11 |
| 4,066,215 | 1/1978 | Pujol | 241/46.11 |
| 4,214,712 | 7/1980 | van Hoorn | 241/46.17 |

Primary Examiner—Howard N. Goldberg
Attorney, Agent, or Firm—Allison C. Collard; Thomas M. Galgano

[57] ABSTRACT

A granulating apparatus comprising a stirring tank or a duct for containing a slurry of particulate to granular coal having a binder incorporated therein, a rotary shaft disposed in the tank or duct and at least one agitating blade made of metal netting and attached to the rotary shaft.

10 Claims, 21 Drawing Figures

APPARATUS FOR GRANULATING COAL

BACKGROUND OF THE INVENTION

This invention relates to a granulating apparatus useful for preparing granules from coal particles contained in coal slurries.

For the transport of coal from mining areas to loading ports over long distances, it is common practice to pulverize coal to particle sizes of up to about 5 mm, disperse the particles in water to obtain a coal slurry and transport the coal slurry through a pipeline. While coal concentrations of such slurries suitable for transport are 50 to 60% by weight, for example, it is favorable that the slurry contain coal particles with a relatively wide particle size distribution, e.g. ranging from fine particles of the order of microns to granules up to about 5 mm in diameter, in view of the transport power, capacity, etc. After transport, the slurry must be dewatered, dried or otherwise treated for the separation of the coal particles from water. If the coal slurry contains fine coal particles, the filter will be clogged up when dewatering the slurry to result in a greatly reduced dewatering efficiency, or the separated particles will take a longer period of time for drying. Furthermore, when coal particles or granules including fines are drawn off from a storage tank, a bridging phenomenon is likely to take place, or fines will be released as dust.

SUMMARY OF THE INVENTION

The main object of the present invention is to overcome the foregoing problems and provide a granulating apparatus comprising a stirring tank or a duct for containing a slurry of particulate to granular coal having a binder incorporated therein, a rotary shaft disposed in the tank or duct and at least one agitating blade made of metal netting and attached to the rotary shaft.

The granulating apparatus of this invention achieves a remarkable result in preparing granules and pellets from coal slurries. For example, after a coal slurry has been transported through a pipeline, the coal particles contained in the slurry can be made into oil-containing granules and pellets of increased sizes with a narrow size distribution. This makes it possible to dewater and dry the slurry very smoothly for the recovery of the coal particles from the slurry with a high efficiency. Consequently, coal can be transported with a greatly improved efficiency for the effective use of coal, hence very economical.

This invention will be described below in greater detail with reference to the accompanying drawings.

DESCRIPTION OF THE PREFERRED EMBODIMENTS

Figure 1:
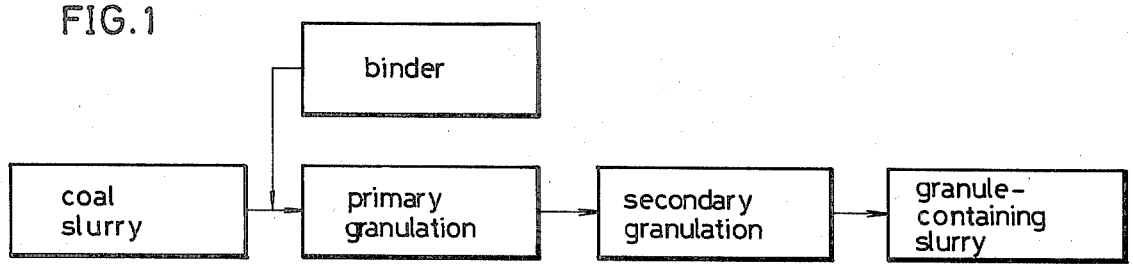
FIG. 1 is a block diagram showing a process for granulating a coal slurry.

With reference to FIG. 1, a binder is added to a coal slurry containing coal particles up to about 5 mm in size. The mixture is then stirred at a high speed of about 2000 to 9000 r.p.m. in a homogenizing mixer (dispersing device) to disperse the binder and apply the binder to the surfaces of the coal particles for primary granulation. Examples of useful binders are oils, such as fuel oil, kerosene, gas oil, residuum oil and vegetable oils. The coal slurry has a coal concentration, for example, of 5 to 30% by weight. The oil binder is added to the slurry in an amount of 5 to 25% by weight based on the amount of the coal in the slurry. Since coal and oil generally have affinity for each other, the oil binder adheres to the surfaces of the coal particles by virtue of the affinity which particles are contained in the slurry, that is, dispersed in water.

Subsequently the coal slurry resulting from the primary granulation step is gently stirred in a granulating apparatus of the invention for secondary granulation to obtain a coal slurry comprising oil-containing granules and pellets of larger sizes which are suitable for the recovery of the coal by the following steps of dewatering, drying, etc.

Figure 2:
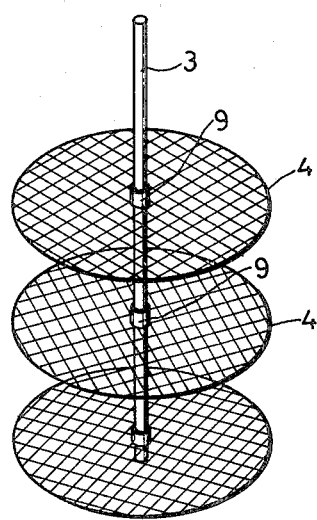
FIG. 2 is a perspective view showing an agitator made of metal netting and useful for this invention.
Figure 3:
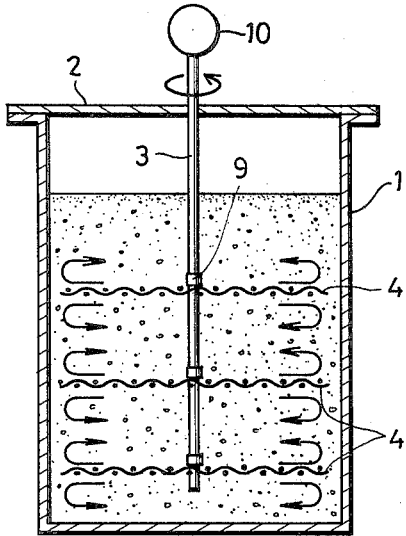
FIG. 3 is a view in section showing a granulating apparatus equipped with the agitator of FIG. 2 and embodying the invention.

FIGS. 2 and 3 show such a granulating apparatus embodying the invention comprising a stirring tank 1 for containing a coal slurry having a binder incorporated therein and resulting from the primary granulation step. The tank 1 has in its interior a rotary shaft 3 provided with three circular agitating blades 4 made of stainless steel netting and disposed at right angles thereto. The blades are spaced apart at a predetermined distance and attached to the shaft 3 by mounting members 9. The netting forming the stirring blades 4 is made of wires 0.5 mm in diameter and has open spaces measuring 5 mm×5 mm. The blades 4 have a diameter corresponding to about 4/5 the inside diameter of the cylindrical stirring tank 1. The distance between the blades 4 corresponds to about 1/5 the diameter of the blades 4. The rotary shaft 3 is driven by a motor 10 at a relatively low speed, for example, of 150 to 300 r.p.m. The stirring tank 1 is covered with a lid 2.

When the coal slurry resulting from the primary granulation step is slowly agitated by the granulating apparatus, the coal particles rollingly move along the inner wall of the tank 1 and agitating blades 4 of metal netting with reduced motion of the water and without incorporating a large amount of air. Thus the coal particles can be agitated effectively. This promotes granulation of the coal particles by joining particles together with the binder adhering to their surfaces effectively. Furthermore coal particles pass through the meshes of the netting of the blades 4, whereby the coal can be granulated with improved effectiveness.

FIGS. 4 to 7 show two other granulating apparatus of the invention. With these embodiments, agitating blades 4 of metal netting are mounted on a rotary shaft 3 in a coal slurry transport duct.

Figure 4:
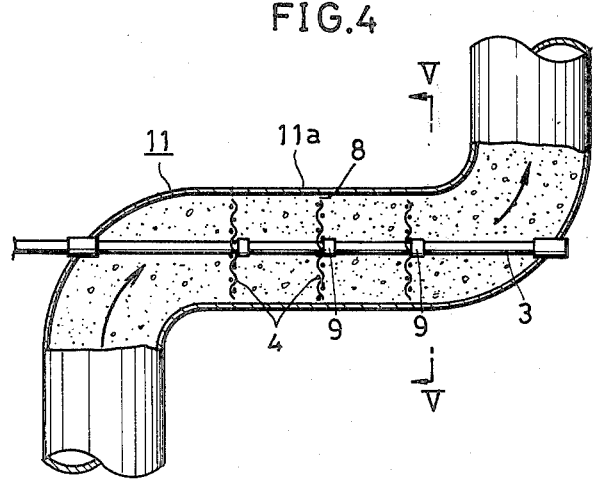
FIG. 4 is a side elevation partly broken away and showing another granulating apparatus embodying the invention.
Figure 5:
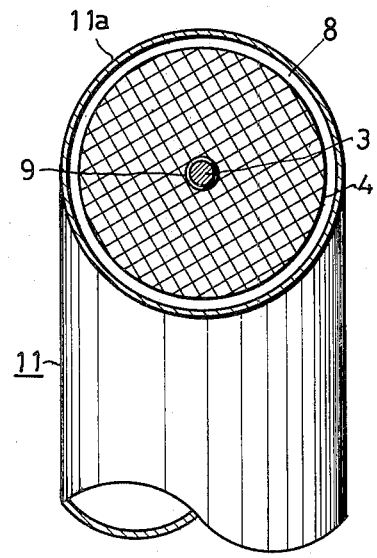
FIG. 5 is an enlarged view in section taken along the line V—V in FIG. 4.

The embodiment shown in FIGS. 4 and 5 comprises a rotary shaft 3 disposed in a short straight section 11a of a duct 11 coaxially therewith. The shaft 3 has one end rotatably by the outside corner portion of one end of the straight section 11a so as to seal it with respect to any liquid, and the other end rotatably and liquid-tightly extending through the outside corner portion of the other end of the straight portion 11a. The shaft 3 is connected to a motor (not shown). The shaft 3 carries three metal netting agitating blades 4 with a clearance 8 formed between the outer periphery of each blade and the inner surface of the duct 11. The coal slurry containing a binder and flowing into the section 11a is stirred by the metal netting blades 4. The movement of coal granules and fine coal particles within the duct 11 or the rolling motion thereof on the duct wall is effective for the progress of granulation. The coal granules formed in the straight section 11a of the duct 11 flow downstream through the clearance 8. Coal granules formed earlier rapidly fall between the blades 4, permitting other fine particles to form granules smoothly.

Figure 6:
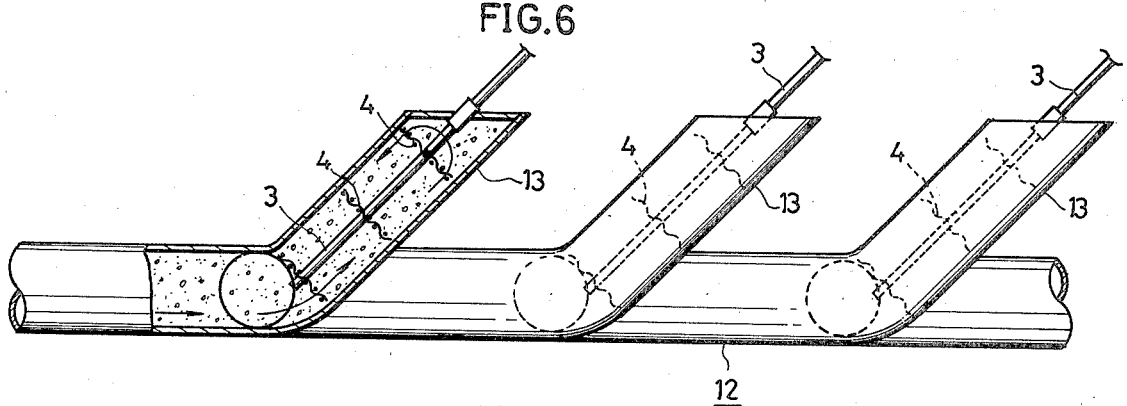
FIG. 6 is a side elevation partly broken away and showing another granulating apparatus embodying the invention.
Figure 7:
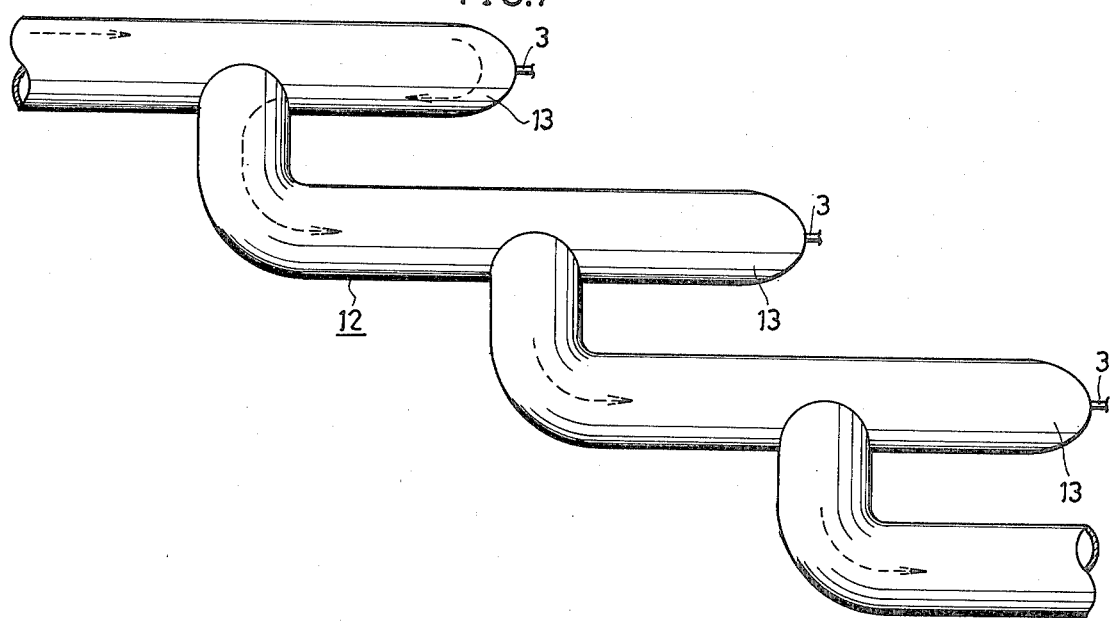
FIG. 7 is a bottom view of the apparatus of FIG. 6.

With the embodiment shown in FIGS. 6 and 7, a coal slurry transport duct includes bent duct sections 12 in three stages. A rotary shaft 3 carrying agitating blades 4 of metal netting is disposed in the bent duct section 12. Each of the bent duct sections 12 has a liquid retaining portion 13, and the rotary shaft 3 carries three metal netting agitating blades 4 and extends through the closed end of the liquid retaining portion 13 rotatably and so as to seal it with respect to any liquid. The rotary shaft 3 is connected to a non-illustrated motor. The coal slurry flows through the liquid retaining portions 13 of the bent duct sections 12 as indicated by arrows and is thereby mixed with the binder oil with improved effectiveness, whereby the coal particles can be granulated efficiently with a wide size distribution.

Although three agitating blades 4 of metal netting are mounted on the rotary shaft 3 according to the three embodiments described above, at least one blade may be provided on the shaft. The agitating blade 4, which is disposed at right angles to the rotary shaft 3, may alternatively be positioned obliquely. The size, shape and mesh size of the metal netting blade 4 are variable in accordance with the sizes of coal particles and granules.

Figure 8:
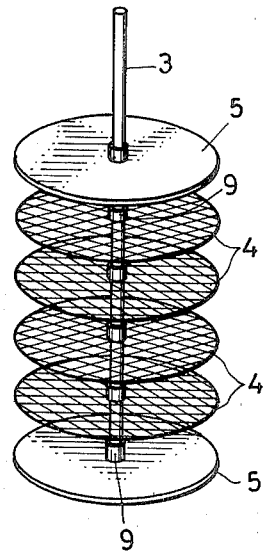
FIG. 8 is a perspective view showing another agitator of metal netting useful for this invention.
Figure 9:
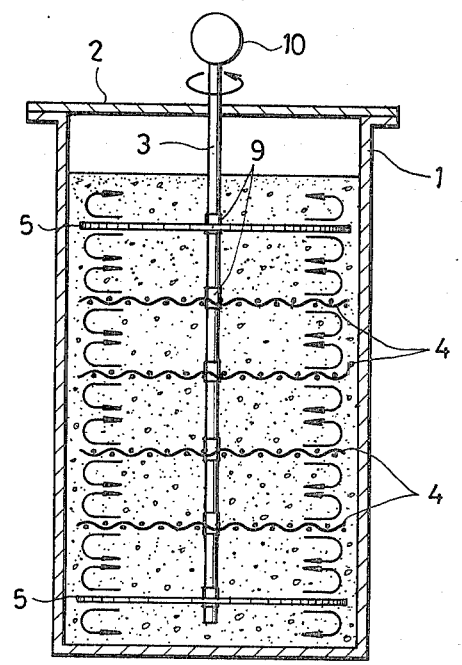
FIG. 9 is a sectional view showing a granulating apparatus of this invention equipped with the agitator of FIG. 8.

FIGS. 8 and 9 show another granulating apparatus embodying the invention, which comprises a stirring tank 1 for containing a coal slurry having incorporated therein a binder and resulting from the primary granulation step, a rotary shaft 3 disposed in the tank 1, and four agitating blades 4 of metal netting and two agitating blades 5 of flat plate which are mounted on the shaft 3. The blades 4 are circular and made of stainless steel netting. The blades 5 are each in the form of a synthetic resin plate and are disposed above and below the group of blades 4. The agitating blades 4 and 5 are spaced apart at a predetermined distance and attached by fastening members 9 to the rotary shaft 3 at right angles thereto. The metal netting blades 4 are made of the same material as those of the foregoing embodiments. The blades 4 and 5 have a diameter corresponding to about 4/5 the inside diameter of the stirring tank 1. The distance between the blades 4 and 5 corresponds to about 1/5 the diameter of these blades.

When a coal slurry resulting from the primary granulation step is stirred slowly by the granulating apparatus, the coal particles very smoothly rollingly move along the agitating plate blades 5 and agitating netting blades 4 as well as along the inner wall of the tank 1 with reduced movement of water and without incorporating a large amount of air into the slurry. Thus the coal particles can be agitated effectively for promoted granulation.

At least one netting blade 4 and at least one plate blade 5 may be mounted on the rotary shaft 3. The locations where the plate blades 5 are disposed are not limited only to above and below the group of netting blades 4; another plate blade 5 may be provided between the netting blades 4. The blades 5, although having the same size as the blades 4, may be slightly smaller than the blades 4. The shape and size of the blades 4, 5 and the mesh size of the blade 4 are variable suitably in accordance with the sizes of the coal particles. The rotary shaft 3, although vertical, can be horizontal.

FIGS. 10 to 15 show three other granulating apparatus embodying the invention.

Figure 10:
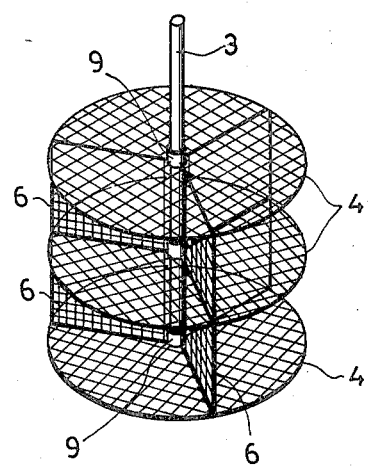
FIG. 10 is a perspective view showing another agitator of metal netting useful for this invention.
Figure 11:
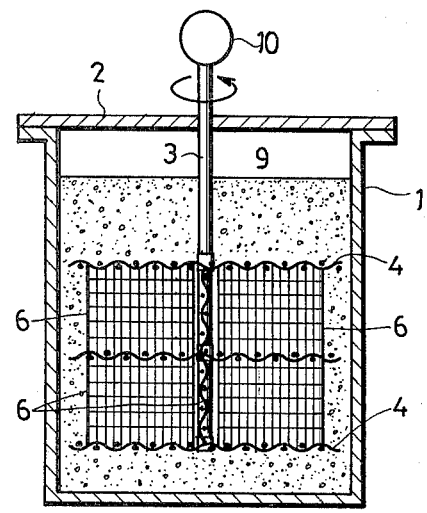
FIG. 11 is a sectional view showing a granulating apparatus of this invention equipped with the agitator of FIG. 10.

The apparatus shown in FIGS. 10 and 11 comprises a stirring tank 1 for containing a coal slurry having a binder incorporated therein and resulting from the primary granulation step, a rotary shaft 3 disposed in the stirring tank 1 and three circular agitating blades 4 of metal netting mounted on the rotary shaft 3 substantially at right angles thereto and spaced apart at a predetermined distance. Three radial agitating blades 6 of metal netting spaced apart by 120 degrees about the rotary shaft 3 are disposed between, and attached to, each two adjacent agitating blades 4. A small clearance is formed between the rotary shaft 3 and the inner side edges of the radial blades 6. The outer side edges of the blades 6 are flush with the outer peripheries of the circular blades 4. These blades 4 and 6 are made of stainless steel netting woven of wires 320 microns in diameter at an opening spacing of 590 microns. Any numbers of blades 4 and 6 are usable as arranged at the desired distances. The blades 4 and 6 may be made of metal nettings of different materials.

When a coal slurry resulting from the primary granulation step is slowly agitated in the granulating apparatus, the coal particles rollingly move along the circular and radial agitating blades 4 and 6 of metal netting smoothly and pass through the meshes of these blades 4 and 6, whereby the particles can be agitated very effectively. This joins coal particles together with the binder oil adhering thereto to assure greatly promoted granulation.

Figure 12:
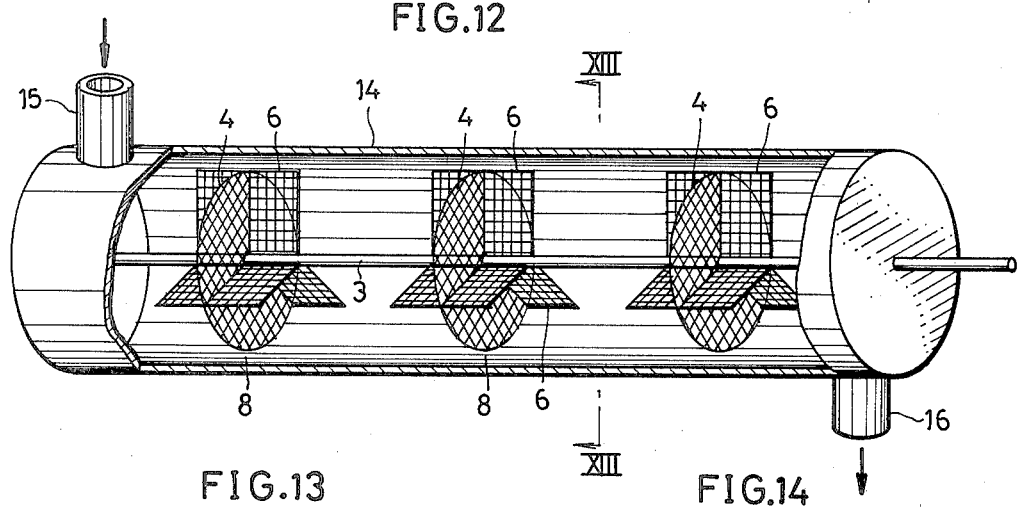
FIG. 12 is a perspective view partly broken away and showing another granulating apparatus embodying the invention.
Figure 13:
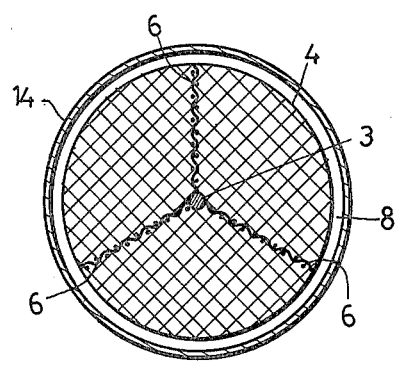
FIG. 13 is an enlarged view in section taken along the line XIII—XIII in FIG. 12.
Figure 14:
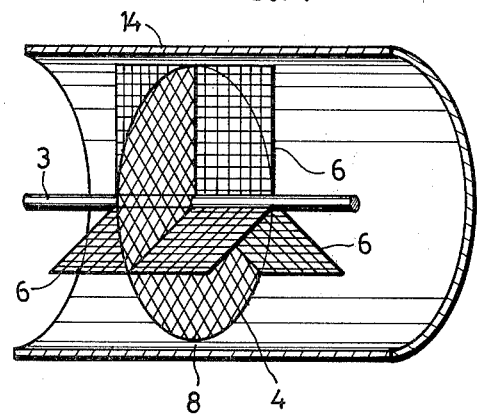
FIG. 14 is a fragmentary perspective view on an enlarged scale of FIG. 12.

The embodiment shown in FIGS. 12 to 14 comprises a horizontal tubular tank 14 having closed ends, a rotary shaft 3 coaxial with the tank 14 and circular agitating blades 4 of metal netting spaced apart from one another by a relatively large distance and mounted on the rotary shaft 3. Radial agitating blades 6 are attached to each side of the circular agitating blades 4. A clearance 8 is provided between the outer periphery of the circular blade 4 and the inner wall of the tank 14. The tank 14 has one end provided with an inlet 15 for supplying a binder-containing coal slurry and an outlet 16 at the other end for discharging the slurry after granulation. A greatly improved granulating effect can be achieved by the use of a plurality of such apparatus, with the outlet of one of the apparatus connected to the inlet of another apparatus in a serial arrangement.

Figure 15:
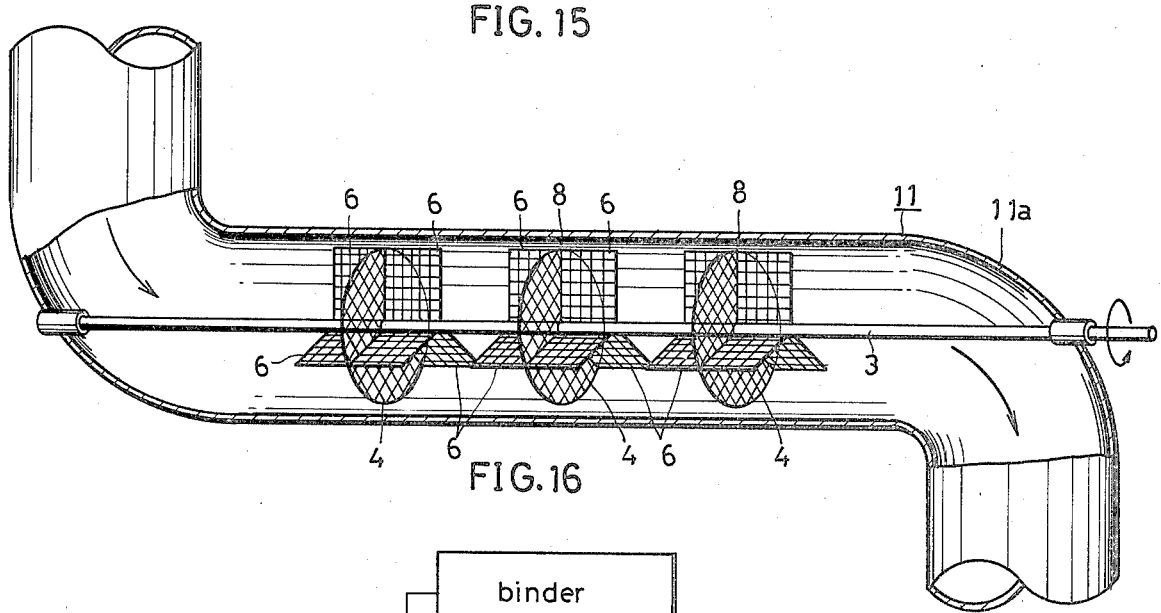
FIG. 15 is a perspective view partly broken away and showing another granulating apparatus embodying the invention.

With the embodiment of FIG. 15 resembling that of FIG. 4, a rotary shaft 3 is disposed horizontally in a straight section 11a of a coal slurry transport duct 11, and circular agitating blades 4 and radial agitating blades 6 of metal netting are attached to the rotary shaft 3 exactly in the same manner as is the case with the embodiment of FIG. 12.

Figure 16:
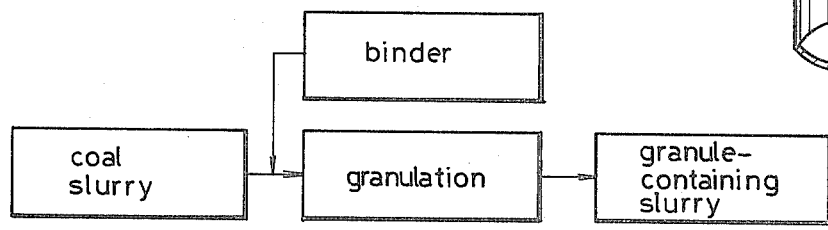
FIG. 16 is a block diagram showing another process for preparing granules from a coal slurry.

FIG. 16 shows another process for preparing granules from a coal slurry, which does not include the primary granulation step shown in FIG. 1 and performed with use of a homogenizing mixer.

A coal slurry having a coal concentration of 30 to 50% by weight and comprising coal particles and granules up to about 5 mm in size is used with addition of a binder oil, such as fuel oil, kerosene, gas oil, residuum oil, vegetable oil or the like. The binder is added to the slurry in an amount, for example, of 5 to 25% by weight based on the amount of coal in the slurry. The mixture of the coal slurry and the binder is agitated for granulation in a granulating apparatus of the invention.

Figure 17:
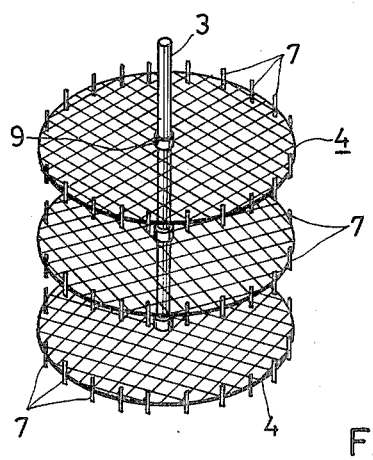
FIG. 17 is a perspective view showing another agitator of metal netting useful for this invention.
Figure 18:
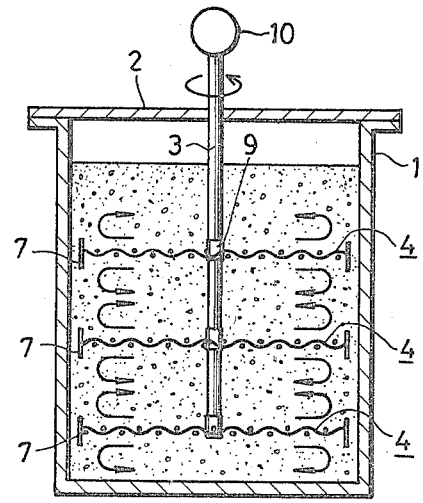
FIG. 18 is a sectional view showing a granulating apparatus equipped with the agitator of FIG. 17 and embodying the invention.

While any one of the foregoing embodiments is of course usable as the granulating apparatus, the apparatus shown in FIGS. 17 to 18 can be used similarly advantageously.

The embodiment shown in FIGS. 17 and 18 has the same construction as the one shown in FIGS. 2 and 3 except that a large number of agitating pins 7 are attached to the outer periphery of each of the three metal netting agitating blades 4. The pins 7 are made of stainless steel and welded to the blade 4 approximately at right angles thereto. The pins 7 are circular in cross section, have a diameter about ½ the mesh size of the metal netting of the blade 4 and a length about 4 to 8 times the mesh size, and are spaced apart by a distance approximately equal to the length of the pins 7. The metal netting agitating blades 4 having such pins 7 are attached to the rotary shaft 3 at right angles thereto by fastening members 9 and spaced apart from one another by a predetermined distance. The rotary shaft is driven at a relatively low speed by a motor 10 such that the peripheral speed of the pin-carrying blades 4 is 6 to 10 m/second.

When a mixture of coal slurry and binder is agitated by the granulating apparatus, the coal particles rollingly move effectively along the inner wall of the stirring tank 1 and the metal netting agitating blades 4 and are also agitated by flows in the vicinity of the pins 7, so that coal particles having the binder adhered thereto are joined together effectively and can be granulated with greatly improved efficiency.

Figure 19:
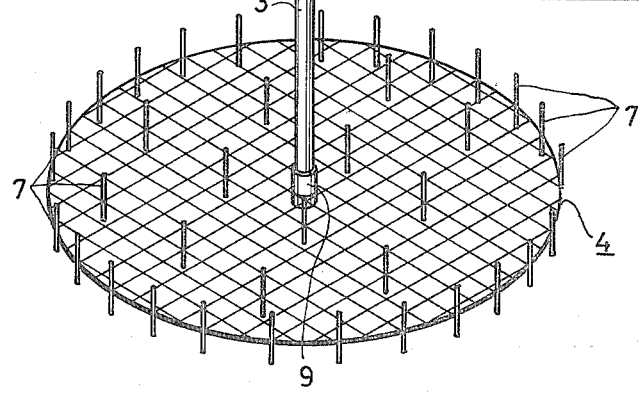
FIG. 19 is a fragmentary enlarged perspective view showing another agitator of metal netting useful for this invention.

While the agitating pins 7 are attached to the peripheries of the stirring blades 4, such pins 7 may be attached to the periphery and the inward portion of each blade 4 as seen in FIG. 19. The pins 7, which are circular in cross section, may be elliptical, square or otherwise shaped in cross section. The pins 7 may be made of a material other than stainless steel insofar as the material has sufficiently high strength and is resistant to corrosion and abrasion. The pins 7, although attached to the blade 4 approximately at right angles thereto, may alternatively be attached thereto as inclined at an angle, for example, of up to about 45 degrees. Furthermore, the pin-carrying blades 4, which are mounted on the rotary shaft 3 at right angles thereto, may alternatively be attached as inclined. The rotary shaft 3, which is vertical, can be horizontal. The shape, size and mesh size of the netting blades 4 are suitably variable in accordance with the sizes of the coal particles.

The present invention will be described below with reference to experimental examples.

EXPERIMENTAL EXAMPLE 1

Granules and pellets were formed from a coal slurry by the process illustrated in FIG. 1.

(I) Preparation of coal slurry

Figure 20:
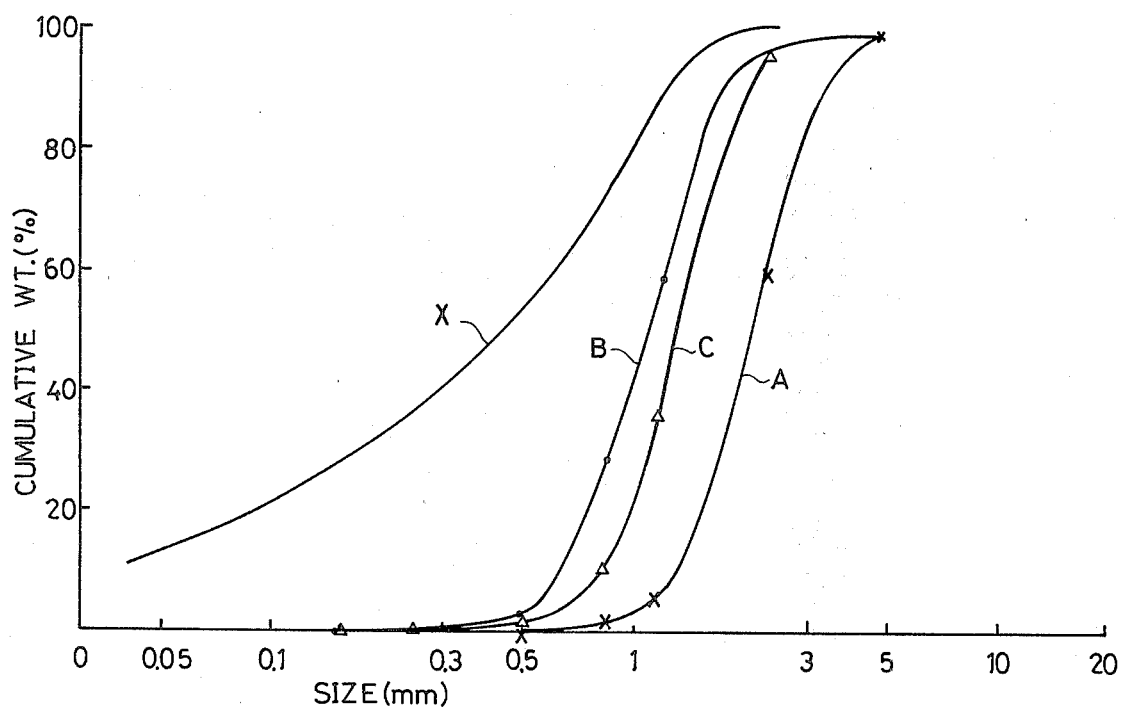
FIGS. 20 and 21 are diagrams each showing particle or granule size distributions as measured for the coal particles and granules contained in a slurry before granulation and for oil-containing coal granules and pellets contained in the slurry after granulation.

Coal pulverized to particle sizes of up to 3 mm was dispersed in tap water by a mixer to prepare a coal slurry having a coal concentration of 7.5% by weight. The particle size distribution of the coal material was determined, with the result represented by Curve X in FIG. 20. It is seen that the coal material comprises coarse coal particles of up to 3 mm in size and fine coal particles as uniformly mixed together and has a wide particle size distribution. The material is therefore suited to pipeline transport in the form of a coal slurry.

(II) Primary granulation

Fuel oil serving as a binder was admixed with the coal slurry, and the mixture was stirred in a homogenizing mixer at 2000 r.p.m. for 10 minutes to disperse the fuel oil in the slurry for primary granulation. The fuel oil was used in an amount of 15.7% by weight based on the amount of coal.

(III) Secondary granulation

The coal slurry resulting from the primary granulation step was agitated at 250 r.p.m. for 2 hours, using the granulating apparatus shown in FIGS. 2 and 3 and having three agitating blades 4 of metal netting.

(IV) Granules and pellets formed in the slurry

The product resulting from the secondary granulation step was classified in water with a screen having openings 500μ in size and dried in a constant-temperature tank at 50° C. The efficiency with which oil-containing granules and pellets were recovered was calculated from the following equation.

$$\text{Recovery efficiency} \atop (\% \text{ by weight}) = \frac{\text{Amount of granules and pellets}}{\text{Amount of coal + amount of oil}} \times 100$$

The oil-containing granules and pellets were recovered with an efficiency of 95.4% by weight. The size distribution of the granules and pellets was determined with the result represented by Curve A in FIG. 20, which indicates that the granulating apparatus of this invention affords oil-containing granules and pellets in large sizes with a narrow size distribution. The apparatus therefore achieves an outstanding granulating effect on coal slurries.

EXPERIMENTAL EXAMPLE 2

The coal slurry preparation step (I) and primary granulation step (II) were performed in the same manner as in Experimental Example 1 except that fuel oil was used in an amount of 15.64% by weight based on the amount of coal.

(III) Secondary granulation

The coal slurry resulting from the primary granulation step was agitated at 175 r.p.m. for 2 hours, using the granulating apparatus shown in FIGS. 8 and 9 and having four metal netting agitating blades 4 and two plate agitating blades 5.

(IV) Granules and pellets formed in the slurry

The product resulting from the secondary granulation step was classified in water with a screen having openings 149μ in size and dried in a constant-temperature tank at 50° C. Oil-containing granules and pellets were recovered with an efficiency of 95.1% by weight as calculated in the same maner as in Experimental Example 1. The size distribution of the product was determined with the result represented by Curve B in FIG. 20, which indicates that the granulating apparatus of the invention gives oil-containing granules and pellets in large sizes with a narrow size distribution.

EXPERIMENTAL EXAMPLE 3

The coal slurry preparation step (I) and primary granulation step (II) were performed in the same manner as in Experimental Example 1 except that 15% by weight of fuel oil was used based on the amount of coal.

(III) Secondary granulation

The coal slurry resulting from the primary granulation step was agitated at 300 r.p.m. for 2 hours, using the granulating apparatus shown in FIGS. 10 and 11 and having three metal netting agitating blades 4 and three radial agitating blades 6 of metal netting which were interposed between each two adjacent blades 4.

(IV) Granules and pellets formed in the slurry

The product resulting from the secondary granulation step was classified in water with a screen having openings 149μ in size and dried in a constant-temperature tank at 50° C. Oil-containing granules and pellets were recovered with an efficiency of 91.2% by weight as calculated in the same manner as in Experimental Example 1. The size distribution of the product was determined with the result represented by Curve C in FIG. 20, which indicates that the granulating apparatus of the invention gives oil-containing granules and pellets in large sizes with a narrow size distribution.

EXPERIMENTAL EXAMPLE 4

Granules and pellets were formed from a coal slurry by the process illustrated in FIG. 16.

(I) Preparation of coal slurry

Coal pulverized to particle sizes of up to 3 mm was dispersed in tap water by a mixer to prepare a coal slurry having a coal concentration of 13% by weight. The particle size distribution of the coal material was determined, with the result represented by Curve Y in FIG. 21. It is seen that the coal material comprises coarse particles of up to 3 mm in size and fine particles as uniformly mixed together and has a wide particle size distribution. The material is therefore suited to pipeline transport in the form of a coal slurry.

(II) Granulation

Fuel oil serving as a binder was admixed with the coal slurry in an amount of 10.2% by weight based on the amount of coal.

For granulation, the mixture of coal slurry and binder was agitated by the granulating apparatus shown in FIGS. 17 and 18. The agitating blades 4 having the pins 7 were driven at a speed of 1900 r.p.m., i.e. at a circumferential speed of 7 m/second, for 10 minutes for agitation.

(III) Granules and pellets formed in the slurry

Figure 21:
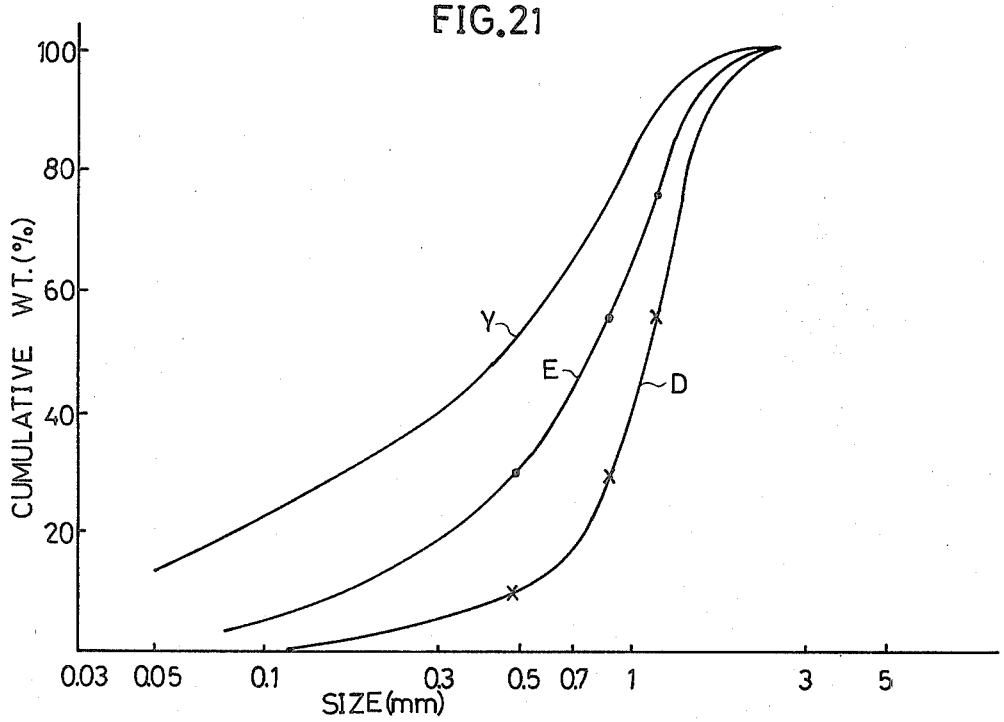

The product resulting from the granulation step was classified in water with a screen having openings 500μ in size and dried in a constant-temperature tank at 50° C. Oil-containing granules and pellets were recovered with an efficiency of 97.3% by weight. FIG. 21, Curve D shows the size distribution of the product.

For comparison, the above experiment was repeated in the same manner except that the three metal netting agitating blades were not provided with any pins. FIG. 21, Curve E shows the size distribution of the resulting product.

A comparison between Curves D and E in FIG. 21 reveals that the granulating apparatus of the invention comprising pin-carrying agitating blades 4 of metal netting affords oil-containing granules and pellets in larger sizes with a narrower size distribution.

Although the preferred embodiments of the invention have been described above as used only for coal slurries, the apparatus of the invention are similarly useful for coke slurries.

The present invention may be embodied differently without departing from the spirit and basic features of the invention. Accordingly the embodiments herein disclosed are given for illustrative purposes only and are in no way limitative. It is to be understood that the scope of the invention is defined by the appended claims rather than by the specification and that various alterations and modifications within the definition and scope of the claims are included in the claims.

What is claimed is:

1. A granulating apparatus, comprising in combination a duct adapted to hold a slurry of particulate to granular coal, and including a plurality of duct sections and liquid-retaining portions, each liquid-retaining portion being disposed downstream of a duct section corresponding thereto, and subtending a predetermined angle with a next duct section downstream thereof, said slurry having a binder incorporated therein, and a plurality of rotary agitators disposed in said duct in series, each agitator being disposed in a corresponding liquid-retaining portion, and including
a rotatable shaft, and
a plurality of agitating blades, each blade extending radially outwardly from said shaft, at least some of said blades being made of netting, whereby, upon flow of said coal slurry through said duct, and upon rotation of said agitators, said binder is made to effectively adhere to the surfaces of the granular coal particles, and said coal particles are granulated efficiently with a wide size distribution.

2. The granulating apparatus as claimed in claim 1, wherein said predetermined angle is in the range from about 45° to about 90°.

3. The granulating apparatus as claimed in claim 1, wherein said netting is metal netting.

4. The granulating apparatus as claimed in claim 1, wherein each of said duct sections is L-shaped.

5. The granulating apparatus as claimed in claim 1, wherein said netting is made up of wires of about 0.5 mm diameter.

6. The granulating apparatus as claimed in claim 5, wherein open spaces between said wires are each dimensioned to be about 5 mm × 5 mm.

7. The granulating apparatus as claimed in claim 1, wherein said duct has a predetermined inside diameter, and wherein each blade has a prearranged outer diameter about 4/5 of said predetermined diameter.

8. The granulating apparatus as claimed in claim 1, further comprising a motor coupled to said rotary shafts operatively rotating between 150 to 300 revolutions per minute.

9. The granulating apparatus as claimed in claim 1, wherein each of said duct sections includes a straight portion.

10. The granulating apparatus as claimed in claim 1, wherein each agitating blade is substantially circular and extends substantially at right angles to the direction of said shaft.

* * * * *